United States Patent
Sager et al.

(10) Patent No.: US 10,557,403 B2
(45) Date of Patent: Feb. 11, 2020

(54) VENTURI-BASED PURGE VAPOR SUPPLY SYSTEM FOR TURBULENT JET IGNITION ENGINES

(71) Applicants: Roger C Sager, Munith, MI (US); Joseph M Dekar, Jackson, MI (US); Matthew M Delleree, Brighton, MI (US); Akshaya Srinivasan, Royal Oak, MI (US); Nithin V Baradwaj, Ann Arbor, MI (US)

(72) Inventors: Roger C Sager, Munith, MI (US); Joseph M Dekar, Jackson, MI (US); Matthew M Delleree, Brighton, MI (US); Akshaya Srinivasan, Royal Oak, MI (US); Nithin V Baradwaj, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 26 days.

(21) Appl. No.: 15/885,099

(22) Filed: Jan. 31, 2018

(65) Prior Publication Data

US 2019/0234294 A1 Aug. 1, 2019

(51) Int. Cl.
*F02B 19/10* (2006.01)
*F02M 25/08* (2006.01)
*F02D 41/00* (2006.01)
*F02M 35/10* (2006.01)

(52) U.S. Cl.
CPC ........... *F02B 19/109* (2013.01); *F02B 19/10* (2013.01); *F02B 19/1004* (2013.01); *F02B 19/108* (2013.01); *F02B 19/1057* (2013.01); *F02B 19/1085* (2013.01); *F02M 25/089* (2013.01); *F02M 25/0836* (2013.01); *F02M 25/0872* (2013.01); *F02D 41/0007* (2013.01); *F02M 35/10222* (2013.01)

(58) Field of Classification Search
None
See application file for complete search history.

(56) References Cited

U.S. PATENT DOCUMENTS

| | | | |
|---|---|---|---|
| 2,148,505 A | 2/1939 | Rosen | |
| 3,908,625 A * | 9/1975 | Romy | F02B 19/10 123/267 |
| 3,919,985 A | 11/1975 | Yagi et al. | |
| 4,006,725 A | 2/1977 | Baczek et al. | |
| 4,060,058 A | 11/1977 | Hideg et al. | |
| 4,077,366 A | 3/1978 | Hideg et al. | |
| 4,108,136 A | 8/1978 | Hideg et al. | |
| 4,218,993 A | 8/1980 | Blackburn | |

(Continued)

*Primary Examiner* — Kevin R Steckbauer
(74) *Attorney, Agent, or Firm* — Ralph E. Smith

(57) ABSTRACT

A Venturi-based purge vapor supply system for a turbulent jet ignition (TJI) engine and its method of operation utilize an air compressor configured to output pressurized air, a vapor canister configured to store purge vapor evaporated from liquid fuel housed in a fuel tank, a purge vapor injector configured to inject a mixture of air and purge vapor into a pre-chamber of the TJI engine and an ejector tee connected between the air compressor, the vapor canister, and the purge vapor injector, the ejector tee having a Venturi-based design such that the pressurized air from the air compressor draws the purge vapor into the ejector tee and combines the air and the purge vapor to form and output the mixture of air and purge vapor to the purge vapor injector.

18 Claims, 4 Drawing Sheets

(56) References Cited

U.S. PATENT DOCUMENTS

| | | | |
|---|---|---|---|
| 4,239,023 A | 12/1980 | Simko | |
| 4,248,189 A | 2/1981 | Barber | |
| 4,315,490 A * | 2/1982 | Webber | F02B 43/00 |
| | | | 123/275 |
| 4,327,547 A * | 5/1982 | Hughes | F23D 11/12 |
| | | | 60/39.463 |
| 4,338,897 A * | 7/1982 | Drumheller | F02B 19/1004 |
| | | | 123/267 |
| 4,712,525 A * | 12/1987 | Ishida | F02B 19/12 |
| | | | 123/145 A |
| 5,081,969 A | 1/1992 | Long, III | |
| 5,222,993 A * | 6/1993 | Crane | F02B 19/12 |
| | | | 123/256 |
| 5,947,076 A | 9/1999 | Srinivasan et al. | |
| 6,354,281 B1 * | 3/2002 | Mitsutani | F02D 41/0032 |
| | | | 123/520 |
| 7,950,364 B2 | 5/2011 | Nerheim | |
| 8,206,470 B1 * | 6/2012 | Jacobson | F02M 43/00 |
| | | | 44/387 |
| 8,843,265 B2 * | 9/2014 | Sager | F02B 29/0406 |
| | | | 701/33.6 |
| 8,924,133 B2 * | 12/2014 | Hadre | F02M 25/0809 |
| | | | 701/107 |
| 9,062,637 B2 * | 6/2015 | Sager | F02B 29/0406 |
| 9,151,212 B2 | 10/2015 | Dumser et al. | |
| 9,249,746 B2 * | 2/2016 | Geckler | F02B 19/108 |
| 9,353,711 B2 * | 5/2016 | Edmund | F02M 25/0872 |
| 9,574,487 B2 | 2/2017 | Gruber et al. | |
| 9,695,737 B2 | 7/2017 | Redtenbacher et al. | |
| 9,995,202 B2 * | 6/2018 | Willi | F02B 19/1004 |
| 10,161,296 B2 * | 12/2018 | Schock | F02B 19/12 |
| 10,161,322 B2 * | 12/2018 | Sager | F02D 41/0032 |
| 10,161,323 B2 * | 12/2018 | Sager | F02D 41/0275 |
| 10,337,397 B2 * | 7/2019 | Shelby | F02B 19/108 |
| 2005/0193993 A1 * | 9/2005 | Dale | F02M 29/04 |
| | | | 123/549 |
| 2010/0223984 A1 * | 9/2010 | Pursifull | F02M 25/0836 |
| | | | 73/114.39 |
| 2012/0016566 A1 * | 1/2012 | Cunningham | F02D 37/02 |
| | | | 701/103 |
| 2013/0220282 A1 * | 8/2013 | Hadre | F02M 25/0809 |
| | | | 123/520 |
| 2013/0282230 A1 * | 10/2013 | Sager | F02B 29/0406 |
| | | | 701/33.6 |
| 2014/0116375 A1 * | 5/2014 | Kim | F02D 19/0605 |
| | | | 123/299 |
| 2014/0196694 A1 * | 7/2014 | Euliss | F02M 25/08 |
| | | | 123/520 |
| 2014/0365071 A1 * | 12/2014 | Sager | F02B 29/0406 |
| | | | 701/33.6 |
| 2015/0096541 A1 * | 4/2015 | Edmund | F02M 35/10222 |
| | | | 123/520 |
| 2015/0354481 A1 * | 12/2015 | Geckler | F02B 19/108 |
| | | | 60/278 |
| 2015/0369184 A1 * | 12/2015 | Bucknell | F02M 35/10229 |
| | | | 123/518 |
| 2016/0047318 A1 * | 2/2016 | Dam | F02C 7/264 |
| | | | 60/776 |
| 2016/0177858 A1 * | 6/2016 | Surnilla | F02D 41/005 |
| | | | 123/294 |
| 2016/0230645 A1 * | 8/2016 | Schock | F02B 19/12 |
| 2016/0305377 A1 * | 10/2016 | Stefaniak | F02M 35/10229 |
| 2018/0038269 A1 * | 2/2018 | Willi | F02B 19/1004 |
| 2018/0142631 A1 * | 5/2018 | Sager | F02D 41/0275 |
| 2018/0142634 A1 * | 5/2018 | Sager | F02D 41/0032 |
| 2018/0258835 A1 * | 9/2018 | Anderson | F02D 9/02 |
| 2018/0363539 A1 * | 12/2018 | Shelby | F02B 19/108 |

\* cited by examiner

VENTURI-BASED PURGE VAPOR SUPPLY SYSTEM FOR TURBULENT JET IGNITION ENGINES

FIELD

The present application generally relates to turbulent jet ignition (TJI) engines and, more particularly, for a Venturi-based purge vapor supply system for TJI engines.

BACKGROUND

Turbulent jet ignition (TJI) engines utilize a pre-chamber to combust a small fraction (e.g., ~3%) of a total fuel amount/energy for a cylinder combustion event. This small fuel charge is rich and a conventional spark plug is typically used for its ignition. A high-pressure jet stream of hot gasses resulting from the combustion is forced through a plurality of small orifices in the pre-chamber and into a main injection chamber of the cylinder. These hot gasses cause ignition of a primary charge of air/fuel mixture within the main combustion chamber without using a spark. For example, these orifices could be designed to optimize the spray of the hot gasses to achieve a more even burn within the main combustion chamber. While a rich fuel pre-charge is required, the main air/fuel charge is able to be much leaner than stoichiometric, which results in improved engine efficiency.

Conventional TJI engine fuel control systems inject liquid fuel into the pre-chamber. One problem with this strategy, however, is that liquid fuel may not be ignitable in the pre-chamber at certain operating conditions, such as engine cold starts and light load conditions. More specifically, fuel vaporization does not occur at these operating conditions, which is necessary to be able to ignite the fuel in the pre-chamber. The failure to ignite the fuel in the pre-chamber could cause increased engine emissions. Providing additional fuel could also increase emissions and/or decrease fuel economy. Accordingly, while such TJI fuel control systems work well for their intended purpose, there remains a need for improvement in the relevant art.

SUMMARY

According to one example aspect of the invention, a Venturi-based purge vapor supply system for a turbulent jet ignition (TJI) engine is presented. In one exemplary implementation, the system comprises an air compressor configured to output pressurized air; a vapor canister configured to store purge vapor evaporated from liquid fuel housed in a fuel tank; a purge vapor injector configured to inject a mixture of air and purge vapor into a pre-chamber of the TJI engine; and an ejector tee connected between the air compressor, the vapor canister, and the purge vapor injector, the ejector tee having a Venturi-based design such that the pressurized air from the air compressor draws the purge vapor into the ejector tee and combines the air and the purge vapor to form and output the mixture of air and purge vapor to the purge vapor injector.

In some implementations, the ejector tee comprises: a first tube connected to the air compressor; a second tube that receives the purge vapor; a third tube connected to the purge vapor injector; and a nozzle disposed within the first tube and upstream from the second and third tubes, wherein a cross-sectional area of the second tube is less than cross-sectional areas of the first and third tubes.

In some implementations, the system further comprises: a first valve disposed between the air compressor and the ejector tee, the first valve being configured to regulate a flow of the pressurized air from the air compressor to the ejector tee; a purge pump configured to pump the purge vapor out of the vapor canister; and a second valve disposed between the purge pump and the second tube of the ejector tee, the second valve being configured to regulate a flow of the purge vapor from the purge pump to the ejector tee.

In some implementations, the system further comprises a controller configured to obtain one or more operating parameters and control at least one of the air compressor, the purge pump, and the first and second valves based on the one or more operating parameters. In some implementations, the one or more operating parameters comprise an engine temperature, and wherein the controller is configured to: detect a cold start of the TJI engine based on the engine temperature; and actuate the air compressor and the purge pump and open the first and second valves in response to detecting the cold start. In some implementations, the one or more operating parameters comprise a load on the TJI engine, and wherein the controller is configured to: detect a light load operating condition of the TJI engine based on the load; and actuate the air compressor and the purge pump and open the first and second valves in response to detecting the light load condition.

In some implementations, the TJI engine comprises a spark plug configured to combust the mixture of air and purge vapor in the pre-chamber, and the pre-chamber defines one or more orifices configured to direct a high-pressure stream of hot gasses resulting from the combustion into a main combustion chamber of a cylinder of the TJI engine. In some implementations, the TJI engine further comprises a liquid fuel injector configured to inject liquid fuel into an intake port of the cylinder, where the liquid fuel is combined with air drawn into the TJI engine through an induction system to form a primary air/fuel mixture.

In some implementations, an amount of purge vapor and an amount of the liquid fuel collectively form a total fuel charge, and the amounts of purge vapor and liquid fuel are approximately 3% and 97% of the total fuel charge, respectively. In some implementations, the high-pressure stream of hot gasses from the pre-chamber ignite the primary air/fuel mixture within the main combustion chamber of the cylinder.

According to another example aspect of the invention, a method of operating a Venturi-based purge vapor supply system for a TJI engine is presented. In one exemplary implementation, the method comprises: obtaining, by a controller, one or more operating parameters; and based on the one or more operating parameters, controlling, by the controller, at least one of an air compressor, a purge pump, and first and second valves, the first valve being connected to the air compressor and the second valve being connected to the purge pump, wherein the system comprises a vapor canister connected to the purge pump and a purge vapor injector, and wherein the system further comprises an ejector tee connected between the first and second valves and the purge vapor injector, the ejector tee having a Venturi-based design such that pressurized air from the air compressor draws purge vapor into the ejector tee and combines the pressurized air and the purge vapor to form and output a mixture of air and purge vapor to the purge vapor injector.

In some implementations, the one or more operating parameters comprise an engine temperature, and the method further comprises: detecting, by the controller, a cold start of the engine based on the engine temperature; and in response to detecting the cold start of the TJI engine, controlling at least one of the air compressor, the purge pump, and the first and second valves. In some implementations, the one or more operating parameters comprise a load on the engine, and the method further comprises: detecting, by the controller, a light load operating condition of the engine based on the load; and in response to detecting the light load operating condition, controlling at least one of the air compressor, the purge pump, and the first and second valves.

In some implementations, the purge fuel injector is a vapor gas injector that opens outwardly towards the pre-chamber as a result of a pressure of the mixture of air and purge vapor and, after injection of the mixture of air and purge vapor into the pre-chamber, closes due to a pressure drop at its source. In some implementations, the method further comprises controlling, by the controller, a spark plug of the TJI engine to combust the desired amount of the mixture of air and purge vapor within the pre-chamber of the TJI engine. In some implementations, the pre-chamber defines one or more orifices configured to direct a high-pressure stream of hot gasses resulting from the combustion into a main combustion chamber of a cylinder of the TJI engine.

In some implementations, the method further comprises controlling, by the controller, a liquid fuel injector of the TJI engine to inject a desired amount of liquid fuel into an intake port of the cylinder, where the desired amount of liquid fuel is combined with a desired amount of air drawn into the TJI engine through an induction system to form a primary air/fuel charge within the main combustion chamber. In some implementations, the high-pressure stream of hot gasses directed into the main combustion chamber causes the primary air/fuel charge to combust within the main combustion chamber.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

A Venturi-based purge vapor supply system for turbulent jet ignition (TJI) engines and its method of operation are presented. These techniques leverage the Venturi effect whereby a fluid throwing a narrowed passage experiences a velocity increase and a pressure decrease. By utilizing highly combustible purge vapor for pre-chamber combustion instead of liquid fuel, the TJI engine is able to operate at cold temperatures. The system utilizes an air compressor to force air through a special ejector tee that is designed to utilize the Venturi effect to draw purge vapor (supplied from a vapor canister) into the ejector tee, which then outputs the air/purge vapor mixture to the pre-chamber via a special injector capable of injecting vapor gas (e.g., similar to a compressed natural gas (CNG) type injector), which is also referred to herein as a vapor gas injector. Valves are disposed along both the air supply and purge vapor supply lines to achieve improved complete system control. One primary benefit is increase fuel economy (e.g., 3-15%). Another potential benefit is decreased system costs by exchanging a direct injection (DI) fuel pump for the air compressor and utilizing port fuel injection instead.

Figure 1:
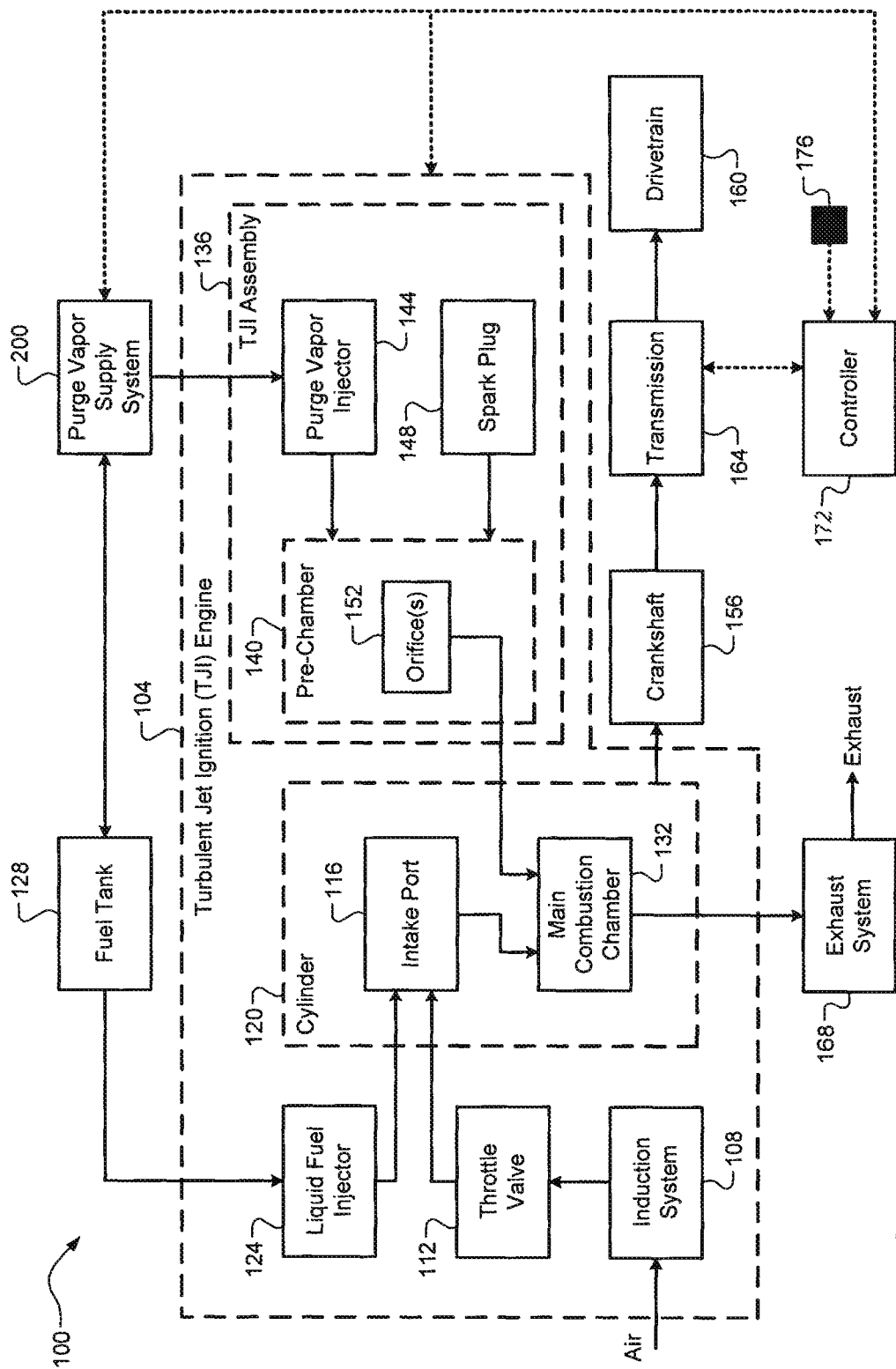
FIG. 1 is a functional block diagram of a vehicle comprising an example turbulent jet ignition (TJI) engine according to the principles of the present disclosure.

Referring now to FIG. 1, a functional block diagram of an example vehicle 100 comprising a TJI engine 104 is illustrated. As previously discussed, the benefits of a TJI engine 104 are being able to operate with a very lean primary air/fuel charge, which results in increased fuel economy and decreased emissions. The TJI engine 104 includes an induction system 108 that draws air through a throttle valve 112 and an intake port 116 of a cylinder 120. While a single intake port 116 and cylinder 120 are shown and discussed herein, it will be appreciated that the TJI engine 104 could include any number of intake ports and respective cylinders (4, 6, 8, etc.). Non-limiting example components of the induction system 108 include an intake pipe, an air filter, and an induction manifold. A liquid fuel injector 124 is configured to inject liquid fuel (e.g., gasoline) from a liquid fuel tank 128 and into the intake port 116, where it is combined with the air to form an air/liquid fuel mixture. This air/liquid fuel mixture is also referred to herein as a primary air/fuel charge and is provided to a main combustion chamber 132 of the cylinder 120. A TJI assembly 136 is also associated with each cylinder 120.

In one exemplary implementation, the TJI assembly 136 includes a pre-chamber 140, another fuel injector 144, and a spark plug 148. For purposes of this disclosure, this other fuel injector 144 is also referred to as a purge vapor injector 144 because it is configured to inject a mixture of air and purge vapor (provided by a Venturi-based purge vapor supply system 200, which is discussed in greater detail below). In one embodiment, the purge vapor injector 144 is a vapor gas injector (e.g., a CNG-type injector) that outwardly opens as a result of the pressurized air/purge vapor mixture at its source and, after injection, closes due to the pressure drop at its source. It will be appreciated, however, that another type of purge vapor injector 144 could be utilized, such as an electronically-actuator injector. The spark plug 148 is configured to generate a spark to ignite the mixture of air and purge vapor within the pre-chamber. While a conventional spark plug 148 is shown and discussed herein, it will be appreciated that other suitable ignition devices could be utilized to combust the air/purge vapor charge, such as a high-intensity plasma/ion stream igniter. The pre-chamber 140 defines one or more apertures or orifices 152 that direct one or more streams of hot gasses resulting from the combustion therethrough and into the main combustion chamber 132.

The hot gasses combust the primary air/fuel charge within the main combustion chamber 132, thereby driving a piston (not shown) to generate drive torque at a crankshaft 156. The drive torque is then transferred from the crankshaft 156 to a drivetrain 160 (e.g., wheels) of the vehicle 100 via a transmission 164. Exhaust gas resulting from combustion within the main combustion chamber 128 are expelled from the cylinder 120 into an exhaust system 168. The exhaust system 168 is configured to treat the exhaust gas to eliminate or reduce emissions (carbon monoxide, nitrogen oxide, carbon monoxide, particulates, etc.) before releasing the exhaust gas into the atmosphere. In some implementations, the exhaust gas could be recirculated into the induction system 108 (exhaust gas recirculation, or EGR) and/or to power a turbocharger (not shown). A controller 172 is configured to control operation of the vehicle 100 as discussed in greater detail below. One or more vehicle sensors 176 are configured to measure operating parameters of the vehicle/engine, such as, but not limited to, engine temperature (e.g, engine coolant temperature), engine load (e.g., accelerator pedal position), engine/vehicle speeds, and purge vapor flow.

Figure 2:
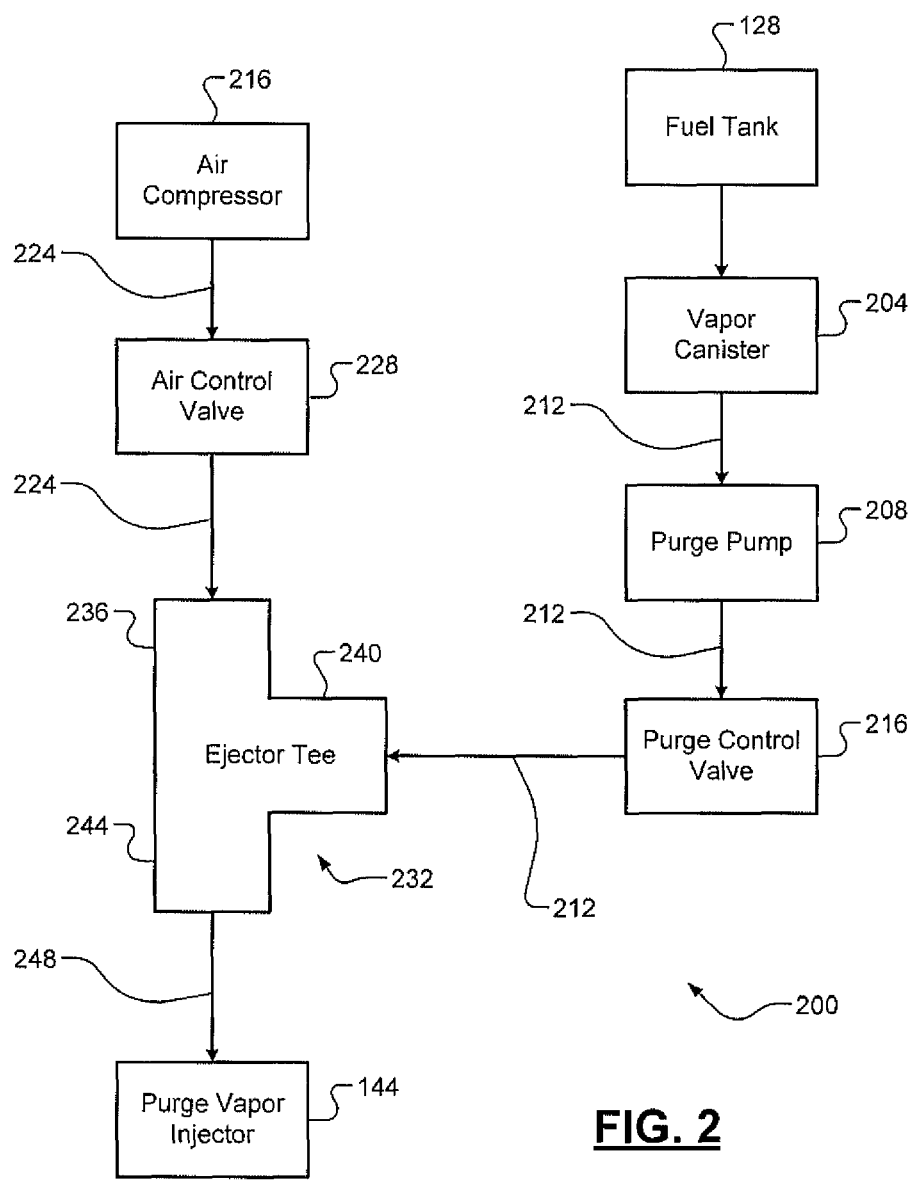
FIG. 2 is a functional block diagram of an example configuration of a Venturi-based purge vapor supply system of the TJI engine of FIG. 1 according to the principles of the present disclosure.

Referring now to FIG. 2, a functional block diagram of an example configuration of the Venturi-based purge vapor supply system 200 is illustrated. The system 200 includes a vapor canister 204 is configured to capture and store purge vapor (also known as "fuel vapor") evaporated from liquid fuel (e.g., gasoline) stored in the liquid fuel tank 128. This evaporation could occur passively or could be performed intentionally/actively. A purge pump 208 is configured to pump purge vapor from the vapor canister 204 and through a purge supply line 212 that is optionally regulated by a purge control valve 216 to control a flow of the purge vapor therethrough. In one exemplary implementation, this purge control valve 216 is an electronically controlled valve that also includes a check valve (not shown) to prevent blowback into the vapor canister 204. The system 200 also includes an air compressor 220 that provides pressurized air via an air supply line 224. The air compressor 220 is any suitable electrically-powered (e.g., battery powered) air compressor, similar to a direct injection (DI) fuel rail compressor/pump, that is able to output pressurized air. An air control valve 228 is optionally disposed along the air supply line 224 to control a flow of the pressurized air therethrough.

The air compressor 216 and the vapor canister 204 are each connected to an ejector tee 232 via their supply lines 212, 224. Specifically, a first or air input tube 236 of the ejector tee 232 is connected to the air supply line 224 and a second or purge input tube 240 of the ejector tee 232 is connected to the purge supply line 212. A third or mixture output tube 244 of the ejector tee 232 is connected to an air/purge mixture supply line 248, which in turn is connected to the purge vapor injector 144. In one exemplary implementation, the ejector tee 232 has a Venturi-based design such that the pressurized air from the air compressor 220 draws the purge vapor from the purge supply line 212 and combines the two to form and output the mixture of air and purge vapor to the purge vapor injector 144. In some implementations, the ejector tee 232 comprises a converging/diverging or Venturi nozzle with some type of choke/throat as discussed in greater detail below.

Figure 3:
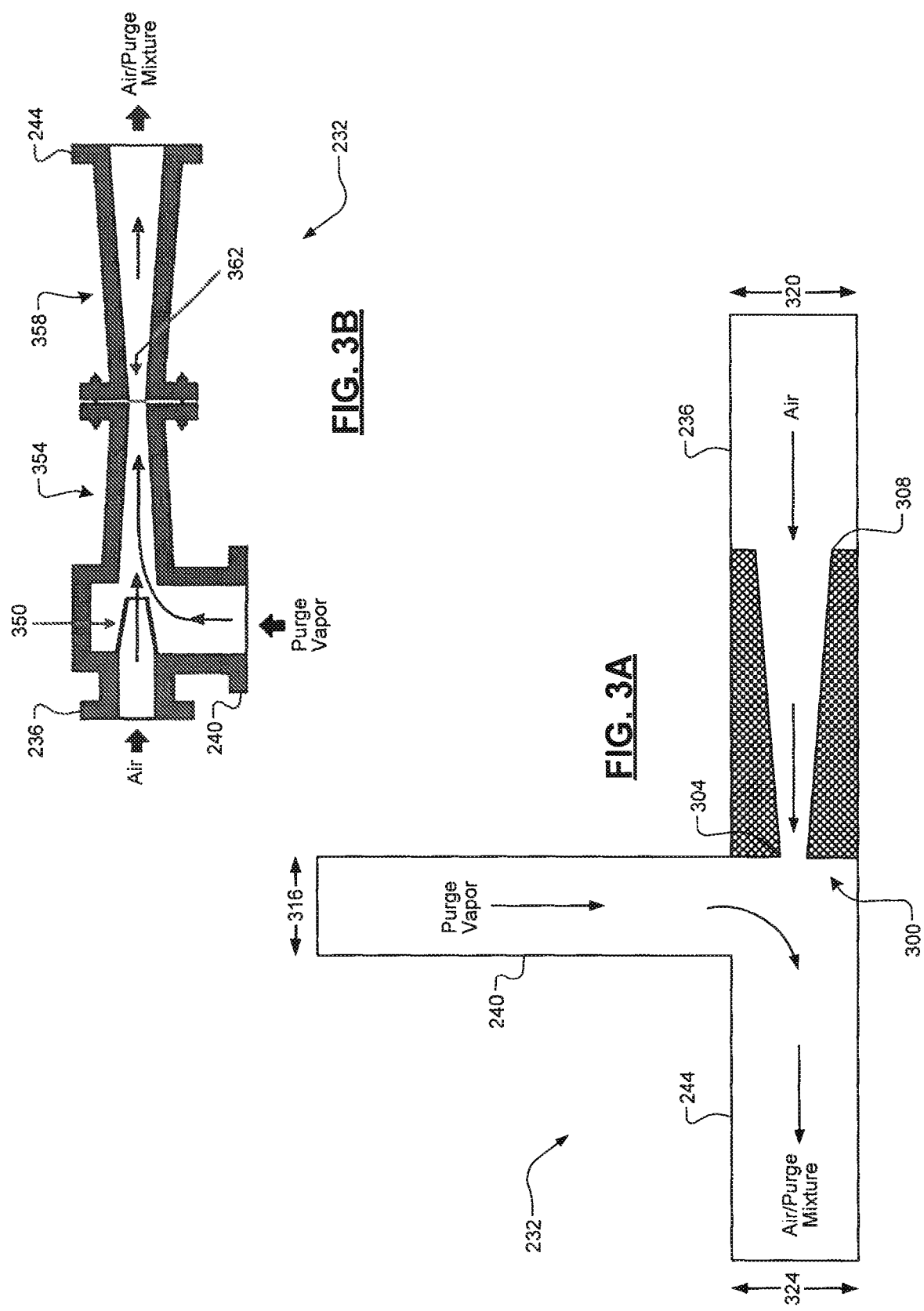
FIGS. 3A-3B are diagrams of example configurations of an ejector tee of the Venturi-based purge vapor supply system of FIG. 2 according to the principles of the present disclosure.

Referring now to FIG. 3A, a first example configuration of the ejector tee 232 is illustrated. The ejector tee 232 includes the air input tube 236, the purge input tube 240, and the mixture output tube 244 as discussed above. While these are referred to as "tubes" herein, it will be appreciated that any type/shape of airflow passage could be utilized. As shown, the air input tube 236 has a nozzle 300 disposed therein, This nozzle 300 has smaller cross-sectional area at its output 304 in relation to its input 308. This allows the nozzle 300 to utilize the Venturi effect to accelerate the fluid (e.g., air) flowing therethrough while also causing a pressure drop that draws the purge vapor in through the purge input tube 240. The resulting pressurized mixture of air/purge vapor is then output to the purge vapor injector 144 via the mixture output tube 244. In some implementations, a cross-sectional area 316 of the purge input tube 240 is less than cross-sectional areas 320, 324 of the air input tube 236 and the mixture output tube 244, respectively, and those cross-sectional areas 320, 324 could also be equal.

FIG. 3B illustrates a second example configuration of the ejector tee 232. A nozzle 350 is disposed within the air input tube 236, which accelerates the pressurized air while also creating a pressure drop thereby drawing in purge vapor through the purge input tube 240. The air/purge vapor mixture then passes through a converging inlet nozzle 354 and a diverging outlet diffuser 358 defining a diffuser throat 362 therebetween. This air/purge vapor mixture is then output to the purge vapor injector 144 via the mixture output tube 244. While these two configurations are illustrated in FIGS. 3A-3B, it will be appreciated that the exact configuration or design of the ejector tee 232, such as the nozzle(s) disposed therein and cross-sectional areas of the tubes, will depend on other factors, such as a volume of the pre-chamber 140. The goal of the configuration/design of the ejector tee 232 is to be able to provide the desired (e.g., stoichiometric) air/purge vapor charge into the pre-chamber 140.

Figure 4:
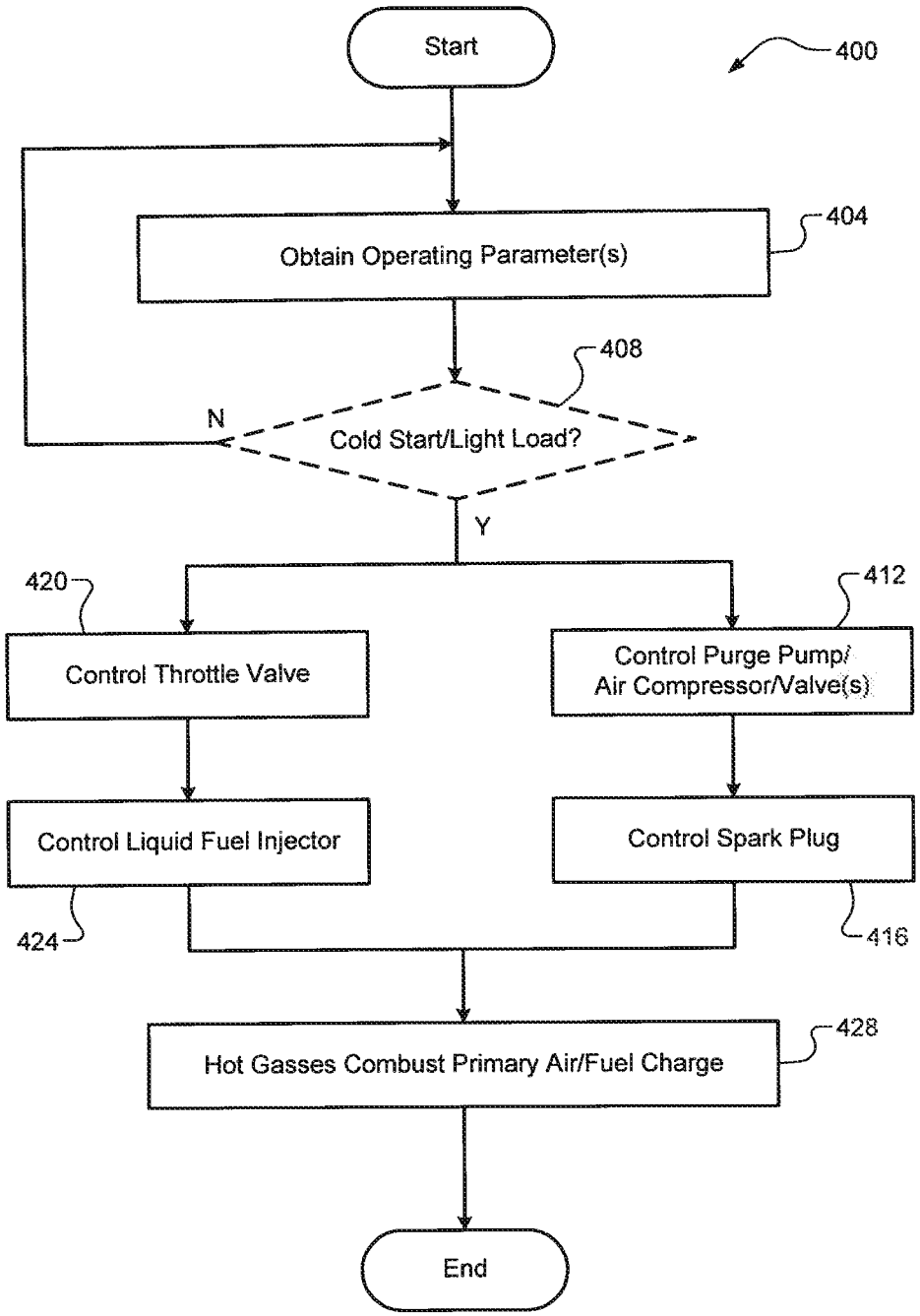
FIG. 4 is a flow diagram of an example method of operating a Venturi-based purge vapor supply system for TJI engines according to the principles of the present disclosure.

Referring now to FIG. 4, a flow diagram of an example method 400 for operating a Venturi-based purge supply system for a TJI engine (e.g., system 200 and TJI engine 104) is illustrated. At 404, the controller 172 obtains one or more operating parameters, e.g., from sensor(s) 176. At 408, the controller 172 utilizes the operating parameter(s) to determine whether the TJI engine 104 is operating at a particular operating condition. Examples of this operating condition include cold start and light load, which could be determined based on engine coolant temperature and accelerator pedal position, respectively. If true, the method 400 proceeds to 412. Otherwise, the method 400 ends. It will be appreciated, however, that the TJI engine 104 could operate using the techniques described herein at all times during which the TJI engine 104 is on, subject to the availability of purge vapor from the vapor canister 204.

At 412, the controller 172 controls at least one of the air compressor 220, the purge pump 208, and valves 216, 228 based on the operating parameter(s) to deliver a desired amount of the air/purge vapor mixture to the purge vapor injector 144. For example, the controller 172 could actuate both the air compressor 220 and the purge pump 208 and open both valves 216, 228. Some of these components, for example, may already be active/open, such as the purge pump 208 pumping purge vapor for other uses or the air compressor 220 and valve 228 being actuated/opened by the controller 172 to blow air through the pre-chamber 140 thereby cleaning it and/or the main combustion chamber 132 prior to an intake stroke of the TJI engine 104. It will be appreciated that open-loop modeling or some sort of closed-loop feedback could be utilized to refine the control of these component(s) such that a desired (e.g., stoichiometric) air/purge vapor charge is delivered to the purge vapor injector 144.

At 416, the controller 172 actuates the spark plug 148 to generate a spark that causes the air/purge vapor mixture to combust within the pre-chamber. As previously discussed, the purge vapor injector 144 outwardly opens when it receives the pressurized air/purge vapor mixture at its source and, after injection, the purge vapor injector 144 closes due to the pressure drop at its source. Concurrently, at 420 and 424, the controller 172 controls the throttle valve 112 and the liquid fuel injector 124 to deliver the primary air/fuel charge to the main combustion chamber 132. At 428, streams of hot gasses resulting from this combustion are directed into the main combustion chamber 132 via the orifice(s) 152 of the pre-chamber 140, which causes the primary air/fuel charge to combust within the main combustion chamber 132, thereby driving a piston (not shown) to generate drive torque at the crankshaft 156. The method 400 then ends or returns to 404.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A Venturi-based purge vapor supply system of a turbulent jet ignition (TJI) engine, the system comprising:
    an air compressor configured to output pressurized air;
    a vapor canister configured to store purge vapor evaporated from liquid fuel housed in a fuel tank;
    a purge vapor injector configured to directly inject a mixture of air and purge vapor into a pre-chamber of the TJI engine; and
    an ejector tee connected between the air compressor, the vapor canister, and the purge vapor injector, the ejector tee having a Venturi-based design such that the pressurized air from the air compressor draws the purge vapor into the ejector tee and combines the air and the purge vapor to form and output the mixture of air and purge vapor to the purge vapor injector.

2. The system of claim 1, wherein the ejector tee comprises:
    a first tube connected to the air compressor;
    a second tube that receives the purge vapor;
    a third tube connected to the purge vapor injector; and
    a nozzle disposed within the first tube and upstream from the second and third tubes,
    wherein a cross-sectional area of the second tube is less than cross-sectional areas of the first and third tubes.

3. The system of claim 2, further comprising:
    a first valve disposed between the air compressor and the ejector tee, the first valve being configured to regulate a flow of the pressurized air from the air compressor to the ejector tee;
    a purge pump configured to pump the purge vapor out of the vapor canister; and
    a second valve disposed between the purge pump and the second tube of the ejector tee, the second valve being configured to regulate a flow of the purge vapor from the purge pump to the ejector tee.

4. The system of claim 3, further comprising a controller configured to obtain one or more operating parameters and control at least one of the air compressor, the purge pump, and the first and second valves based on the one or more operating parameters.

5. The system of claim 4, wherein the one or more operating parameters comprise an engine temperature, and wherein the controller is configured to:
    detect a cold start of the TJI engine based on the engine temperature; and
    actuate the air compressor and the purge pump and open the first and second valves in response to detecting the cold start.

6. The system of claim 4, wherein the one or more operating parameters comprise a load on the TJI engine, and wherein the controller is configured to:
    detect a light load operating condition of the TJI engine based on the load; and
    actuate the air compressor and the purge pump and open the first and second valves in response to detecting the light load condition.

7. The system of claim 1, wherein the TJI engine comprises a spark plug configured to combust the mixture of air and purge vapor in the pre-chamber, and wherein the pre-chamber defines one or more orifices configured to direct a high-pressure stream of hot gasses resulting from the combustion into a main combustion chamber of a cylinder of the TJI engine.

8. The system of claim 7, wherein the TJI engine further comprises a liquid fuel injector configured to inject liquid fuel into an intake port of the cylinder, wherein the liquid fuel is combined with air drawn into the TJI engine through an induction system to form a primary air/fuel mixture.

9. The system of claim 8, wherein an amount of purge vapor and an amount of the liquid fuel collectively form a total fuel charge, and wherein the amounts of purge vapor and liquid fuel are approximately 3% and 97% of the total fuel charge, respectively.

10. The system of claim 8, wherein the high-pressure stream of hot gasses from the pre-chamber ignite the primary air/fuel mixture within the main combustion chamber of the cylinder.

11. A method of operating a Venturi-based purge vapor supply system of a turbulent jet ignition (TJI) engine, the method comprising:
    obtaining, by a controller, one or more engine operating parameters; and
    based on the one or more engine operating parameters, controlling, by the controller, at least one of an air compressor, a purge pump, and first and second valves, the first valve being connected to the air compressor and the second valve being connected to the purge pump,
    wherein the system comprises a vapor canister connected to the purge pump, and a purge vapor injector configured to directly inject a mixture of air and purge vapor into a pre-chamber of the TJI engine, and
    wherein the system further comprises an ejector tee connected between the first and second valves and the purge vapor injector, the ejector tee having a Venturi-based design such that pressurized air from the air compressor draws purge vapor into the ejector tee and combines the pressurized air and the purge vapor to form and output the mixture of air and purge vapor to the purge vapor injector.

12. The method of claim 11, wherein the one or more operating parameters comprise an engine temperature, and further comprising:
   detecting, by the controller, a cold start of the engine based on the engine temperature; and
   in response to detecting the cold start of the TJI engine, controlling at least one of the air compressor, the purge pump, and the first and second valves.

13. The method of claim 11, wherein the one or more operating parameters comprise a load on the engine, and further comprising:
   detecting, by the controller, a light load operating condition of the engine based on the load; and
   in response to detecting the light load operating condition, controlling at least one of the air compressor, the purge pump, and the first and second valves.

14. The method of claim 11, wherein the purge vapor injector is a vapor gas injector that opens outwardly towards the pre-chamber as a result of a pressure of the mixture of air and purge vapor and, after injection of the mixture of air and purge vapor into the pre-chamber, closes due to a pressure drop at its source.

15. The method of claim 11, further comprising controlling, by the controller, a spark plug of the TJI engine to combust a desired amount of the mixture of air and purge vapor within the pre-chamber of the TJI engine.

16. The method of claim 15, wherein the pre-chamber defines one or more orifices configured to direct a high-pressure stream of hot gasses resulting from the combustion into a main combustion chamber of a cylinder of the TJI engine.

17. The method of claim 16, further comprising controlling, by the controller, a liquid fuel injector of the TJI engine to inject a desired amount of liquid fuel into an intake port of the cylinder, wherein the desired amount of liquid fuel is combined with a desired amount of air drawn into the TJI engine through an induction system to form a primary air/fuel charge within the main combustion chamber.

18. The method of claim 17, wherein the high-pressure stream of hot gasses directed into the main combustion chamber causes the primary air/fuel charge to combust within the main combustion chamber.

* * * * *